United States Patent [19]
Mukaiya

[11] Patent Number: 5,146,366
[45] Date of Patent: Sep. 8, 1992

[54] FOUR-GROUP ZOOM LENS
[75] Inventor: Hitoshi Mukaiya, Toda, Japan
[73] Assignee: Canon Kabushiki Kaisha, Tokyo, Japan
[21] Appl. No.: 717,062
[22] Filed: Jun. 18, 1991
[30] Foreign Application Priority Data
Jun. 29, 1990 [JP] Japan .................................. 2-173209
[51] Int. Cl.$^5$ .............................................. G02B 15/16
[52] U.S. Cl. ...................................... 359/683; 359/688
[58] Field of Search ............... 359/683, 684, 685, 688, 359/676

[56] References Cited
U.S. PATENT DOCUMENTS

| | | | |
|---|---|---|---|
| 4,720,181 | 1/1988 | Hata | 359/683 |
| 4,770,510 | 9/1988 | Mukaiya . | |
| 4,812,024 | 3/1989 | Mukaiya . | |
| 4,824,226 | 4/1989 | Tanaka | 359/683 |
| 4,846,563 | 7/1989 | Mukaiya . | |
| 4,934,796 | 6/1990 | Sugiura et al. . | |
| 5,050,972 | 9/1991 | Mukaiya et al. . | |
| 5,056,900 | 10/1991 | Mukaiya et al. . | |

FOREIGN PATENT DOCUMENTS 60-230112 11/1985 Japan .
62-91908 4/1987 Japan .
1790911 7/1989 Japan .

Primary Examiner—Jon W. Henry
Attorney, Agent, or Firm—Fitzpatrick, Cella, Harper & Scinto

[57] ABSTRACT

A zoom lens comprising a first lens group having a positive refractive power; a second lens group having a negative refractive power that moves for zooming; a third lens group movable to correct image surface movement; and a fourth lens group stationary during zooming. The fourth lens group consists of six lenses. The first lens reduces divergence of a light beam. Further, if the overall focal length of the system at the wideangle end is $F_W$; the focal length of the second lens group is $F_2$; the focal length of the combination of the second to sixth lenses is $F_{42}$; and the focal length of the combination of the second to fourth lenses is $F_A$, then the conditions:

$$0.85 < |F_2/F_W| < 1.0$$
$$2.50 < F_{42}/F_W < 3.0$$
$$0.80 < F_A/F_{42} < 1.0$$

are satisfied.

2 Claims, 9 Drawing Sheets

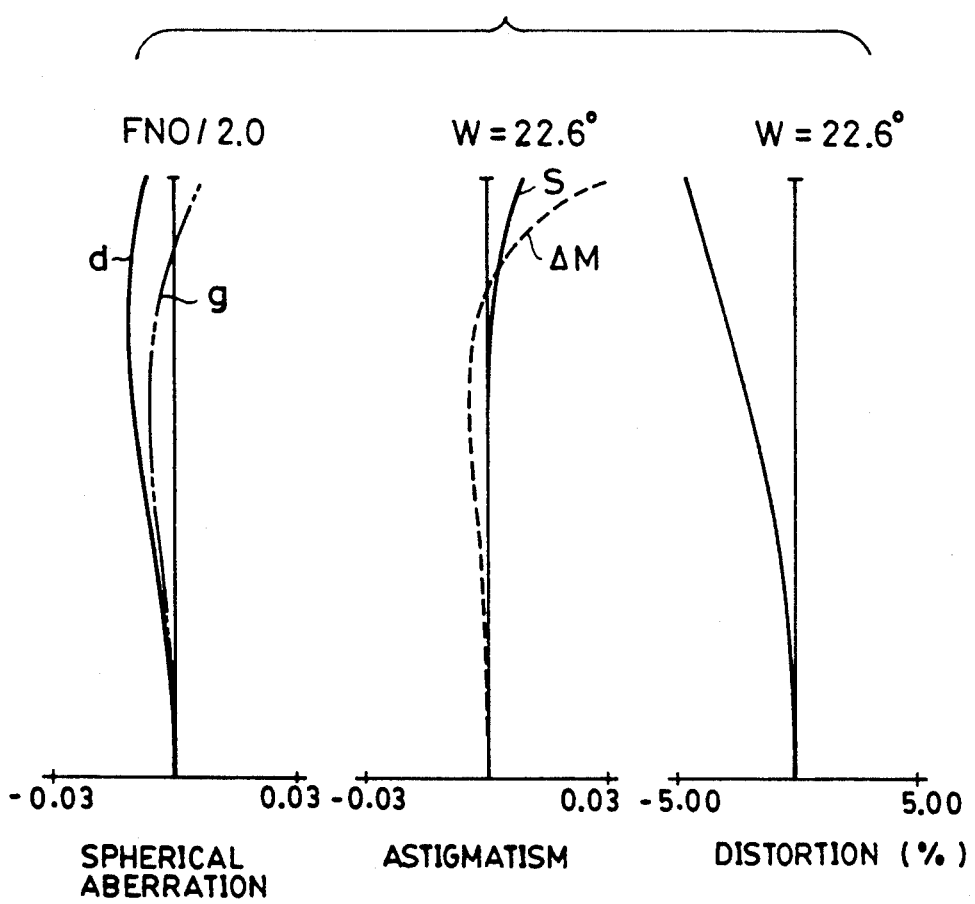

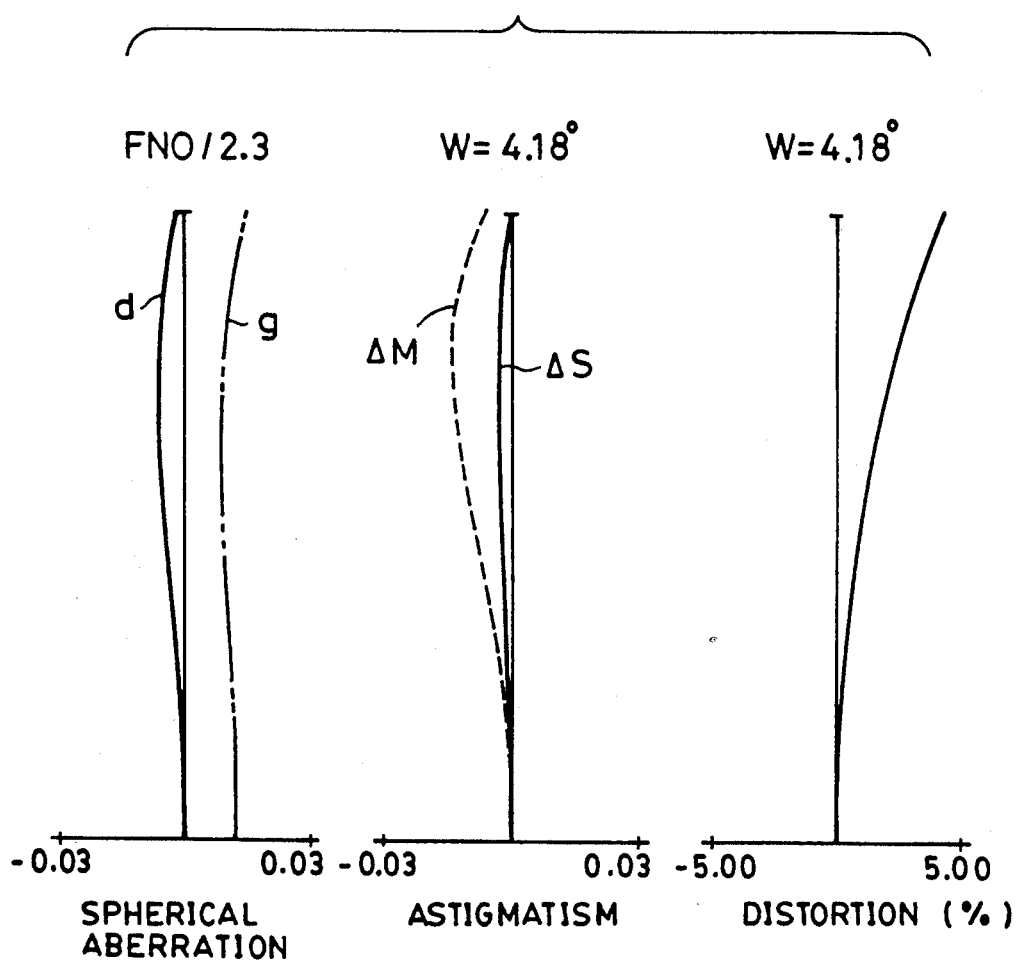

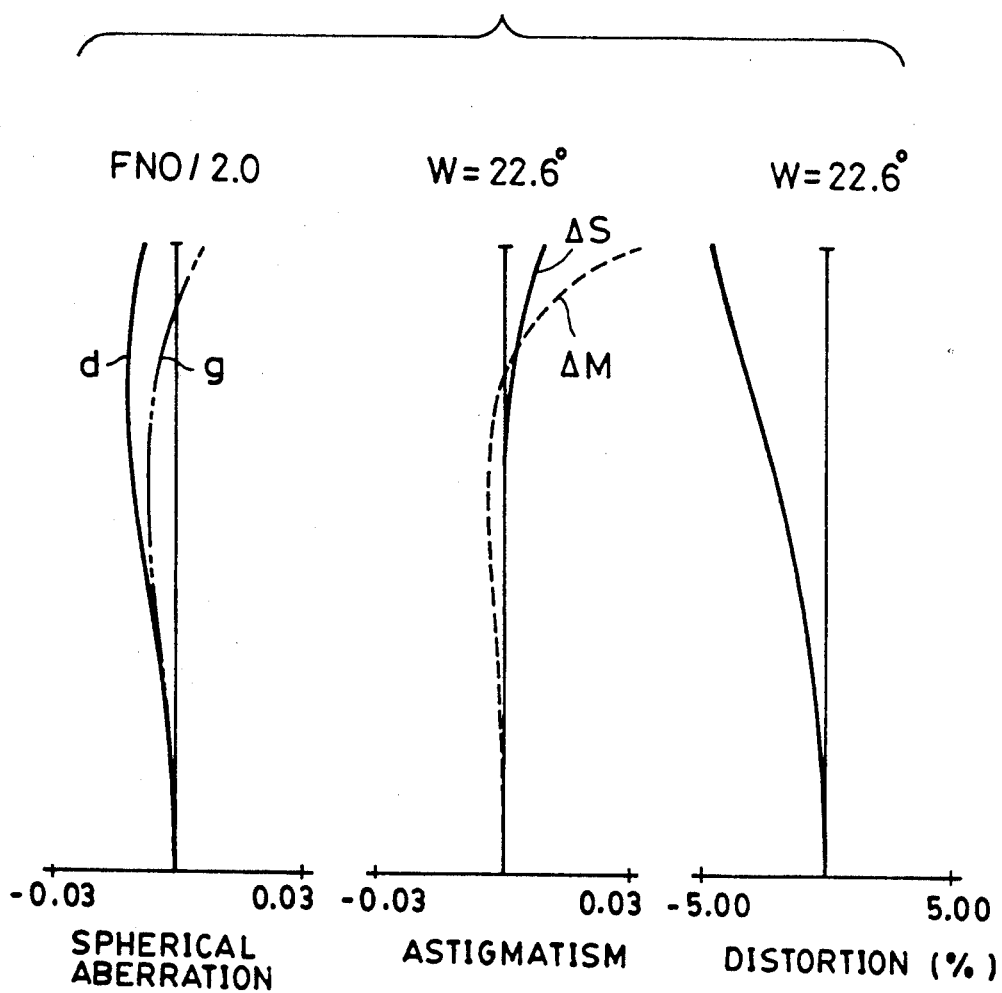

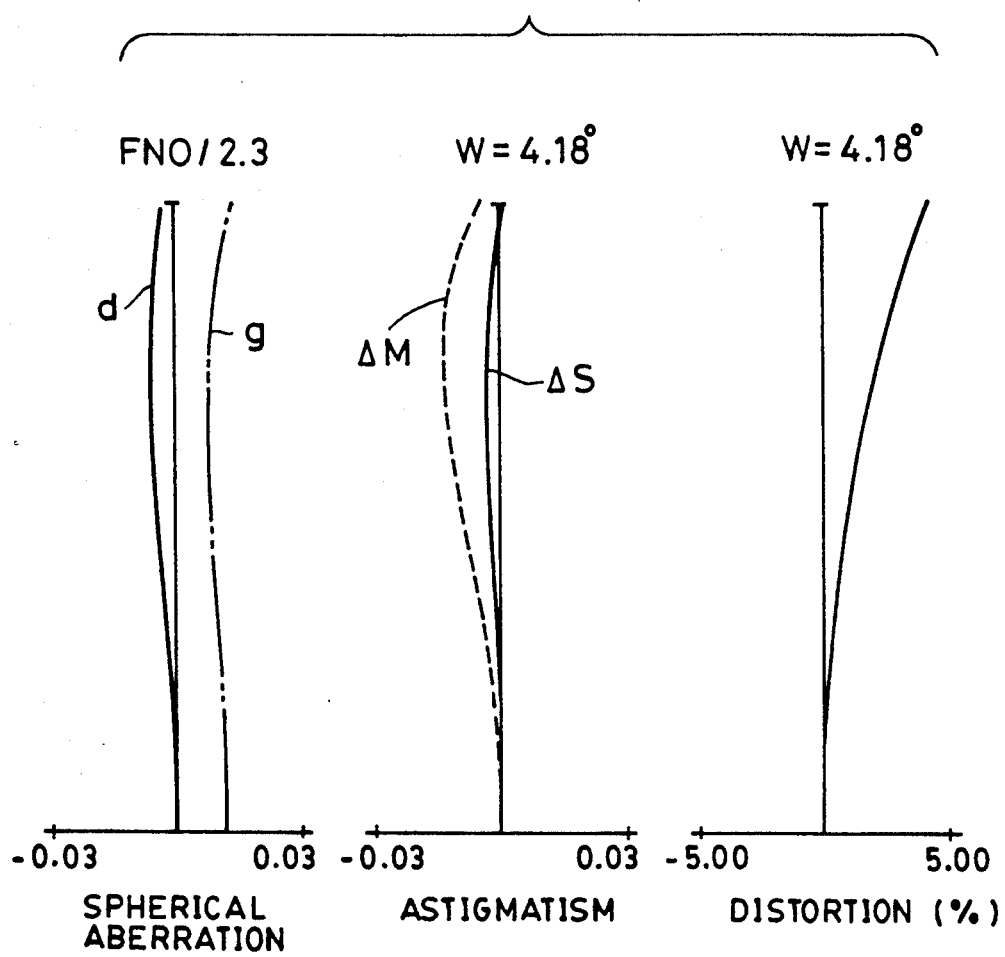

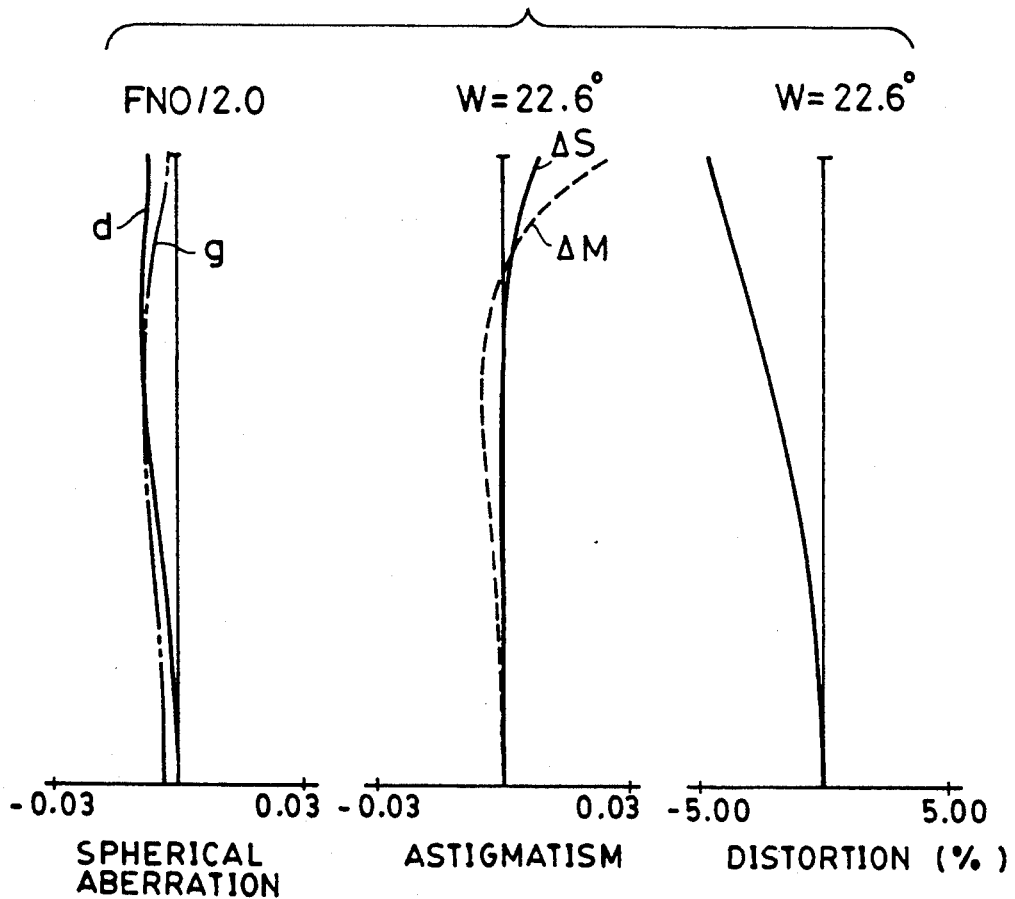

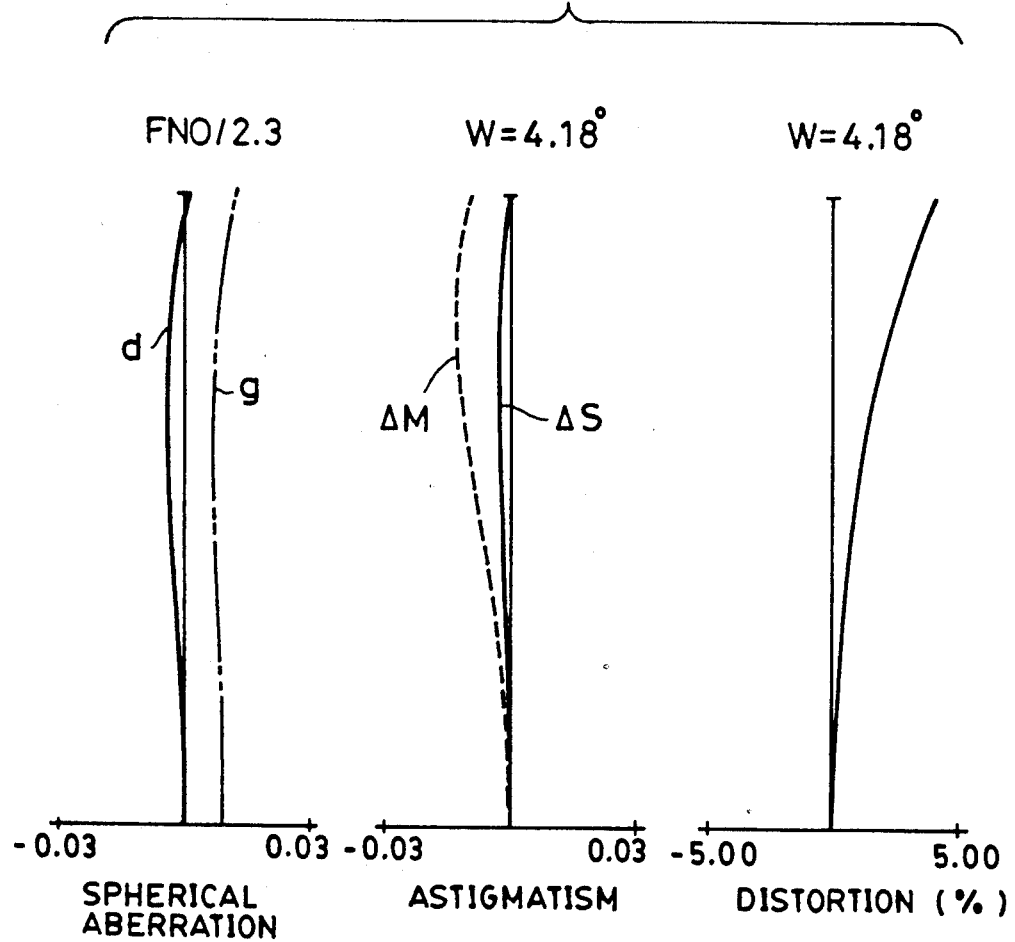

FOUR-GROUP ZOOM LENS

BACKGROUND OF THE INVENTION

1. Field of the Invention

This invention relates to an improvement in a zoom lens small in size and weight, having an aperture ratio of about 2.0 and a variable power ratio of about 6 and suitable for video cameras or still cameras.

2. Description of the Prior Art

Four-group zoom lenses are known with a variable power ratio of about 6 wherein six lenses constitute a fourth group that performs an imaging function. For example, zoom lenses disclosed in Japanese Patent Laid-Open Nos.60-230112, 62-91908, and 1-170911 are of this type.

A tendency to use smaller image pickup devices is now common, and even ⅓ inch size image pickup devices are now being used. To design a zoom lens covering the standard view angle for such image pickup devices, it is necessary to reduce the focal length. However, since the thicknesses of the infrared cut filter and the optical low-pass filter cannot be substantially reduced, there is a need to maintain a sufficiently long back-focal distance. That is, it is necessary that the focal length is reduced while the back-focal distance is relatively increased.

It is difficult to reduce the focal length while maintaining a desired back-focal distance. For example, the problem of an increase in the length of the fourth group of lenses or an increase in the aperture of the groups of lenses is encountered when the desired back-focal distance is maintained.

SUMMARY OF THE INVENTION

In view of this problem, an object of the present invention to provide a zoom lens wherein a long back-focal length is maintained while at the same time the effective optical aperture is reduced and the overall length is shortened for a reduction in the overall size.

Another object of the present invention is to provide a zoom lens in which the aperture ratio is set to about 2.0 while suitably correcting variations of aberrations due to high variable power design.

To achieve these objects, according to the present invention, there is provided a zoom lens including:

a first lens group having a positive refractive power;

a second lens group having a negative refractive power and capable of being moved along the optical axis for zooming;

a third lens group movable to correct the movement of an image surface caused by zooming; and a fourth lens group having a positive refractive power that is stationary during zooming, the first to fourth lens groups being successively arranged from the object side in this order, wherein the fourth lens group consists of a first lens for reducing, in a step-by-step fashion, the divergence of a light beam caused by the third lens group, the first lens having a positive refractive power, and also a second lens having a positive refractive power, a third lens having a negative refractive power, a fourth lens having a positive refractive power, a fifth lens having a negative refractive power, and a sixth lens having positive refractive power;

wherein if the overall focal length of the system at the wideangle end is $F_W$; the focal length of the second lens group is $F_2$; the focal length of the combination of the second lens to the sixth lens of the fourth lens group is $F_{42}$; and the focal length of the combination of the second lens to the fourth lens is $F_4$, then the conditions:

$$0.85 < |F_2/F_W| < 1.0$$
$$2.50 < F_{42}/F_W < 3.0$$
$$0.80 < F_A/F_{42} < 1.0$$

are Satisfied.

BRIEF DESCRIPTION OF THE DRAWINGS

FIGS. 2 to 5 are diagrams of aberrations of numerical examples 1 to 4;

FIGS. 2A to 5A show aberrations at the wideangle limits; and

FIGS. 2B to 5B show aberrations at the telephoto limits; d and g representing d- and g-lines, respectively; ΔS and ΔM representing the sagittal image surface and the meridional image surface, respectively.

DESCRIPTION OF THE PREFERRED EMBODIMENTS

Figure 1:
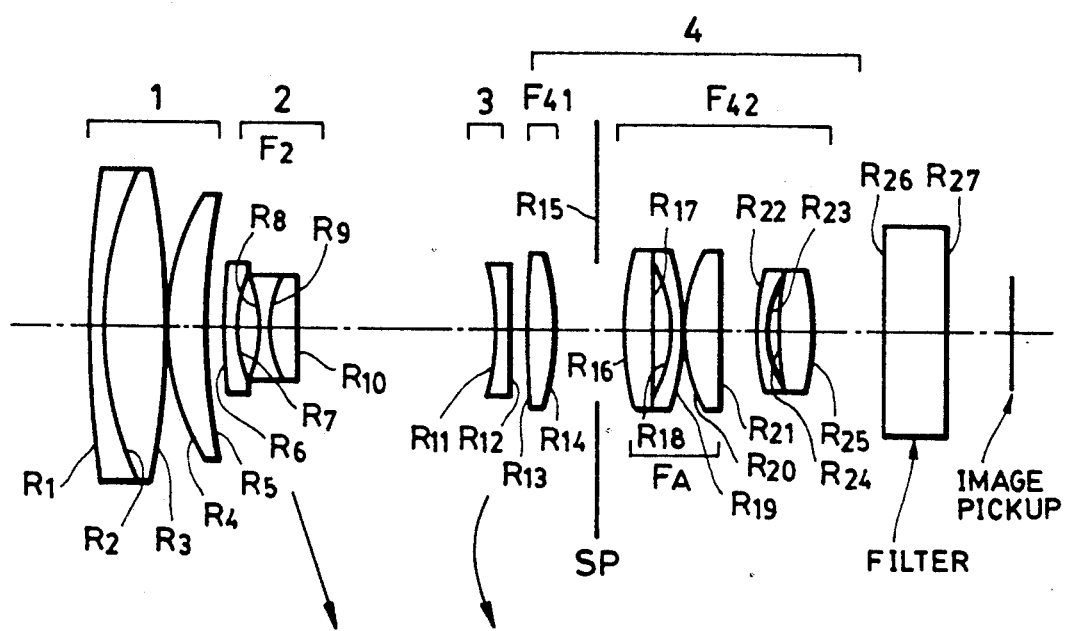
FIG. 1 is a cross-sectional view of a zoom lens in accordance with the present invention.
Figure 5A:
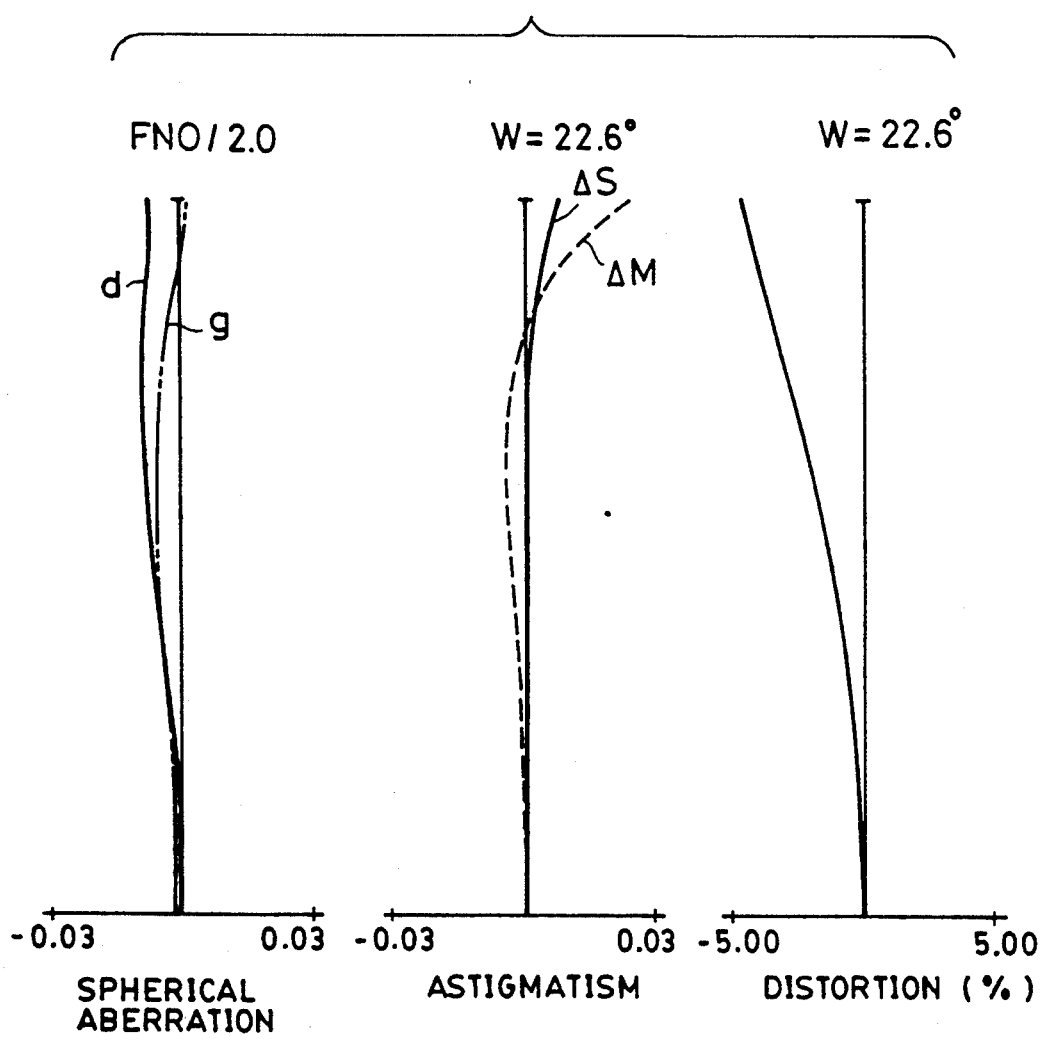
Figure 5B:
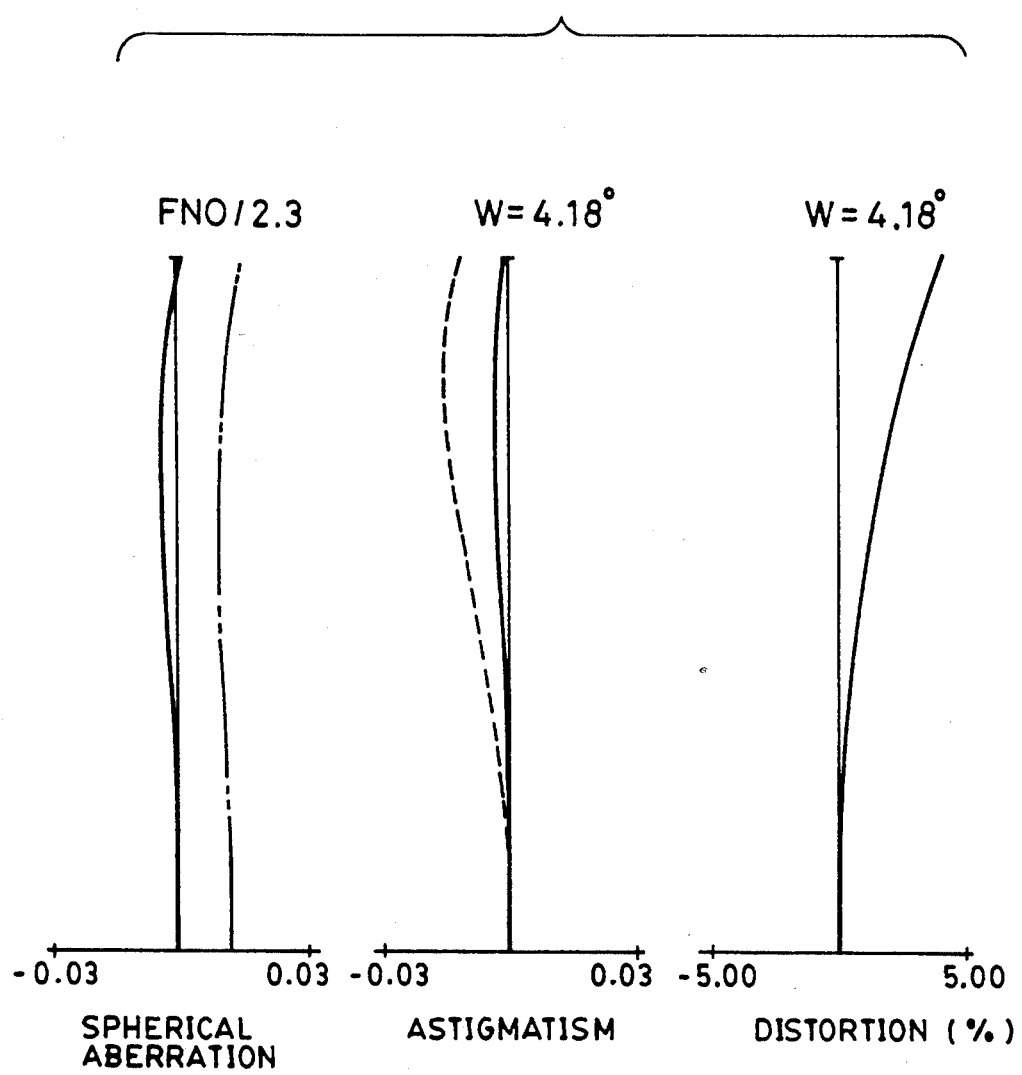

Referring to FIG. 1, a zoom lens in accordance with the present invention has a first lens group 1 having a positive refractive power, a second lens group 2 having a negative refractive power and capable of being moved along the optical axis to change the power of the zoom lens, a third lens group 3 having a negative refractive power and movable to correct the movement of an image surface caused by zooming, and a fourth lens group 4 having a positive refractive power that is stationary during zooming. The arrows indicate zooming loci from the wideangle side to the telephoto side. In this embodiment, the fourth lens group 4 consists of six lenses. A first lens has a positive refractive power for reducing, step by step, the extent of divergence of the light beam increased by the third lens group. The fourth lens group also consists of a second lens having a second lens having a positive refractive power, a third lens having a negative refractive power, a fourth lens having a positive refractive power, a fifth lens having a negative refractive power, and a sixth lens having a positive refractive power. The lens system is arranged so as to satisfy each of the following conditional formulae.

If the overall focal length of the system at the wideangle limit is $F_w$; the focal length of the second lens group is $F_2$; the focal length of the combination of the second to sixth lenses of the fourth lens group is $F_{42}$; and the focal length of the combination of the second to fourth lenses of the fourth lens group is $F_A$, then the following three conditions are to be satisfied:

$$0.85 < |F_2/F_W| < 1.0 \quad (1)$$
$$2.50 < F_{42}/F_W < 3.0 \quad (2)$$
$$0.80 < F_A/F_{42} < 1.0 \quad (3)$$

Conditional formula (1) determines a range for the balance of the second lens group with respect to the whole system. If the upper limit of this formula is exceeded, the extent of movement of the second lens group at the time of zooming is so large that it is difficult to reduce the overall size of the zoom lens. If the lower limit is exceeded, the Petzval's sum produced with respect to the second lens group is negative and increased and, therefore, it is difficult to correct aberations.

Conditional formulae (2) and (3) relate to the focal length of the lens system on the image surface side of the second lens of the fourth lens group. According to formula (2), if the upper limit is exceeded, the afocal power at the telephoto limit is increased. The refractive power of the first lens group is thereby increased so that the variation in the position of the focal plane due to an error in the position of the first lens group cannot be sufficiently corrected. If the lower limit is exceeded, it is difficult to maintain the desired back-focal distance. If the upper limit of conditional formula is exceeded, a light beam incident upon the fifth lens is not sufficiently stopped and, therefore, the outside diameter of the lens needs to be increased. If the lower limit is exceeded, it is difficult to maintain the desired long back-focal distance.

For a more suitable aberration correction, it also is preferable to satisfy the following equations:

$$0.4 < D_A/F_W < 0.6 \quad (4)$$
$$1.5 < N_P < 1.6 \quad (5)$$
$$15 < \nu_A < 20 \quad (6)$$

where $D_A$ the sum of the free air spacings between the fourth to sixth lenses; NP is a mean for the refractive indices of the fourth and sixth lenses: and $V_A$ is the difference between the Abbe's numbers of the fifth and sixth lenses.

These additional conditional formulae will be described below.

Conditional formula (4) bounds the free air spacings between the fourth and sixth lenses. If the upper limit of this formula is exceeded, the setting of the spacings goes against the design for reducing the size of the whole lens system, and the back-focal distance cannot be sufficiently maintained. If the lower limit is exceeded, it is difficult to correct aberrations while balancing on-axis aberrations and off-axis aberrations. For example, even if a spherical aberration, which is an on-axis aberration, is corrected, coma flare with respect to an intermediate view angle is increased and the curvature of the image surface is also increased.

Conditional formula (5) relates to a mean for the refractive indices of the fourth and sixth lenses. If the upper limit of this formula is exceeded, a negative Petzval's sum produced with respect to the second lens group cannot be cancelled out. If the lower limit is exceeded, the curvature of each positive lens is so large that it is difficult to correct the negative spherical aberration.

Conditional formula (6) relates to the Abbe's numbers of the fifth and sixth lenses. If the upper or lower limit is exceeded, chromatic aberrations from magnification cannot suitably be corrected.

Preferably, within the fourth lens group, the first lens has a double convex shape, the third lens has a shape such that a deeper-concave surface faces the object, and the fifth lens has a shape such that a deeper-concave surface faces the image surface In this embodiment, the zoom lens is focused by moving the first lens group.

Numerical examples of this embodiment will be shown below. Values of each numerical example, in accordance with the above conditional formulae, are shown in the following Table I. For $b_f/F_w$, $b_f$ represents the back-focal distance and the focal length FW at the wideangle limit.

In each numerical example, Ri is the ith radius of curvature from the object side, $D_i$ is the thickness and the aerial spacing of the ith lens from the object side, and $N_i$ and $V_i$ are the refractive index and the Abbe's number, respectively, the glass for the ith lens, as measured from the object side. Also, R26 and R28 correspond to an optical filter and a face plate or the like.

TABLE I

|  | Example 1 | Example 2 | Example 3 | Example 4 |
|---|---|---|---|---|
| Conditional formula (1) | 0.917 | 0.917 | 0.916 | 0.916 |
| Conditional formula (2) | 2.744 | 2.742 | 2.738 | 2.740 |
| Conditional formula (3) | 0.934 | 0.913 | 0.904 | 0.920 |
| Conditional formula (4) | 0.506 | 0.504 | 0.501 | 0.463 |
| Conditional formula (5) | 1.578 | 1.578 | 1.542 | 1.542 |
| Conditional formula (6) | 17.4 | 17.4 | 17.4 | 17.4 |
| $b_f/F_W$ | 1.885 | 1.882 | 1.82 | 1.924 |

The variable in TABLE I are derived from the following set of four numerical examples, which further illustrate embodiments of the present invention. The value for Ri correspond to those illustrated in FIG. 1.

Numerical Example 1

F = 1~5.7   FNO = 1:2.0~2.3   2ω= 45.24°~8.36°

| R1 = 12.783 | D1 = 0.139 | N1 = 1.80518 | V1 = 25.4 |
| R2 = 3.398 | D2 = 0.597 | N2 = 1.62299 | V2 = 58.1 |
| R3 = −8.323 | D3 = 0.027 | | |
| R4 = 2.444 | D4 = 0.375 | N3 = 1.69680 | V3 = 55.5 |
| R5 = 6.501 | D5 = variable | | |
| R6 = 5.728 | D6 = 0.111 | N4 = 1.77250 | V4 = 49.6 |
| R7 = 1.050 | D7 = 0.271 | | |
| R8 = −1.301 | D8 = 0.097 | N5 = 1.77250 | V5 = 49.6 |
| R9 = 1.302 | D9 = 0.291 | N6 = 1.80518 | V6 = 25.4 |
| R10 = −7.266 | D10 = variable | | |
| R11 = −2.342 | D11 = 0.111 | N7 = 1.69680 | V7 = 55.5 |
| R12 = −182.651 | D12 = variable | | |
| R13 = 5.105 | D13 = 0.319 | N8 = 1.69680 | V8 = 55.5 |
| R14 = −2.243 | D14 = 0.458 | | |
| R15 = (aperture) | D15 = 0.305 | | |
| R16 = 3.732 | D16 = 0.319 | N9 = 1.51742 | V9 = 52.4 |
| R17 = −7.501 | D17 = 0.187 | | |
| R18 = −1.324 | D18 = 0.111 | N10 = 1.80518 | V10 = 25.4 |
| R19 = −2.072 | D19 = 0.020 | | |
| R20 = 1.592 | D20 = 0.403 | N11 = 1.58913 | V11 = 61.2 |
| R21 = −14.002 | D21 = 0.404 | | |
| R22 = 3.594 | D22 = 0.111 | N12 = 1.80518 | V12 = 25.4 |
| R23 = 1.043 | D23 = 0.101 | | |
| R24 = 2.245 | D24 = 0.347 | N13 = 1.56732 | V13 = 42.8 |
| R25 = −2.247 | D25 = 0.750 | | |
| R26 = ∞ | D26 = 0.639 | N14 = 1.51633 | V14 = 64.1 |
| R27 = ∞ | | | |

| Variable distance | Focal length | | |
|---|---|---|---|
| | 1.00 | 2.50 | 5.70 |
| D5 | 0.16 | 1.32 | 1.94 |
| D10 | 2.03 | 0.63 | 0.29 |
| D12 | 0.18 | 0.42 | 0.14 |

Numerical Example 2

F = 1~5.7   FNO = 1:2.0~2.3   2ω= 45.24°~8.36°

| R1 = 12.785 | D1 = 0.139 | N1 = 1.80518 | V1 = 25.4 |
| R2 = 3.398 | D2 = 0.597 | N2 = 1.62299 | V2 = 58.1 |
| R3 = −8.324 | D3 = 0.027 | | |
| R4 = 2.444 | D4 = 0.375 | N3 = 1.69680 | V3 = 55.5 |
| R5 = 6.502 | D5 = variable | | |
| R6 = 5.729 | D6 = 0.111 | N4 = 1.77250 | V4 = 49.6 |
| R7 = 1.050 | D7 = 0.271 | | |
| R8 = −1.301 | D8 = 0.097 | N5 = 1.77250 | V5 = 49.6 |

-continued

Numerical Example 2

| R9 = 1.302 | D9 = 0.292 | N6 = 1.80518 | V6 = 25.4 |
| R10 = −7.267 | D10 = variable | | |
| R11 = −2.341 | D11 = 0.111 | N7 = 1.69680 | V7 = 55.5 |
| R12 = −71.926 | D12 = variable | | |
| R13 = 5.106 | D13 = 0.319 | N8 = 1.69680 | V8 = 55.5 |
| R14 = −2.271 | D14 = 0.458 | | |
| R15 = (aperture) | D15 = 0.305 | | |
| R16 = 3.754 | D16 = 0.319 | N9 = 1.51742 | V9 = 52.4 |
| R17 = −7.502 | D17 = 0.187 | | |
| R18 = −1.324 | D18 = 0.111 | N10 = 1.80518 | V10 = 25.4 |
| R19 = −2.067 | D19 = 0.020 | | |
| R20 = 1.592 | D20 = 0.403 | N11 = 1.58913 | V11 = 61.2 |
| R21 = −13.914 | D21 = 0.402 | | |
| R22 = 3.595 | D22 = 0.111 | N12 = 1.80518 | V12 = 25.4 |
| R23 = 1.042 | D23 = 0.101 | | |
| R24 = 2.243 | D24 = 0.347 | N13 = 1.56732 | V13 = 42.8 |
| R25 = −2.243 | D25 = 0.750 | | |
| R26 = ∞ | D26 = 0.639 | N14 = 1.51633 | V14 = 64.1 |
| R27 = ∞ | | | |

| Variable distance | Focal length | | |
| --- | --- | --- | --- |
| | 1.00 | 2.50 | 5.70 |
| D5 | 0.16 | 1.32 | 1.94 |
| D10 | 2.03 | 0.62 | 0.29 |
| D12 | 0.18 | 0.43 | 0.14 |

Numerical Example 3

F = 1∼5.7  FNO = 1:2.0∼2.3  2ω = 45.24°∼8.36°

| R1 = 12.760 | D1 = 0.138 | N1 = 1.80518 | V1 = 25.4 |
| R2 = 3.392 | D2 = 0.596 | N2 = 1.62299 | V2 = 58.1 |
| R3 = −8.308 | D3 = 0.027 | | |
| R4 = 2.439 | D4 = 0.374 | N3 = 1.69680 | V3 = 55.5 |
| R5 = 6.489 | D5 = variable | | |
| R6 = 5.718 | D6 = 0.111 | N4 = 1.77250 | V4 = 49.6 |
| R7 = 1.048 | D7 = 0.270 | | |
| R8 = −1.298 | D8 = 0.097 | N5 = 1.77250 | V5 = 49.6 |
| R9 = 1.299 | D9 = 0.291 | N6 = 1.80518 | V6 = 25.4 |
| R10 = −7.253 | D10 = variable | | |
| R11 = −2.354 | D11 = 0.111 | N7 = 1.69680 | V7 = 55.5 |
| R12 = −226.078 | D12 = variable | | |
| R13 = 5.231 | D13 = 0.319 | N8 = 1.69680 | V8 = 55.5 |
| R14 = −2.234 | D14 = 0.457 | | |
| R15 = (aperture) | D15 = 0.305 | | |
| R16 = 4.001 | D16 = 0.319 | N9 = 1.58913 | V9 = 61.2 |
| R17 = −7.487 | D17 = 0.187 | | |
| R18 = −1.322 | D18 = 0.111 | N10 = 1.80518 | V10 = 25.4 |
| R19 = −2.114 | D19 = 0.020 | | |
| R20 = 1.596 | D20 = 0.402 | N11 = 1.51742 | V11 = 52.4 |
| R21 = −6.110 | D21 = 0.399 | | |
| R22 = 3.717 | D22 = 0.111 | N12 = 1.80518 | V12 = 25.4 |
| R23 = 1.058 | D23 = 0.101 | | |
| R24 = 2.226 | D24 = 0.346 | N13 = 1.56732 | V13 = 42.8 |
| R25 = −2.355 | D25 = 0.749 | | |
| R26 = ∞ | D26 = 0.638 | N14 = 1.51633 | V14 = 64.1 |
| R27 = ∞ | | | |

| Variable distance | Focal length | | |
| --- | --- | --- | --- |
| | 1.00 | 2.50 | 5.70 |
| D5 | 0.16 | 1.32 | 1.93 |
| D10 | 2.03 | 0.62 | 0.29 |
| D12 | 0.17 | 0.42 | 0.14 |

Numerical Example 4

F = 1∼5.7  FNO = 1:2.0∼2.3  2ω = 45.24°∼8.36°

| R1 = 12.764 | D1 = 0.138 | N1 = 1.80518 | V1 = 25.4 |
| R2 = 3.393 | D2 = 0.596 | N2 = 1.62299 | V2 = 58.1 |
| R3 = −8.311 | D3 = 0.027 | | |
| R4 = 2.440 | D4 = 0.374 | N3 = 1.69680 | V3 = 55.5 |
| R5 = 6.491 | D5 = variable | | |
| R6 = 5.720 | D6 = 0.111 | N4 = 1.77250 | V4 = 49.6 |
| R7 = 1.048 | D7 = 0.270 | | |
| R8 = −1.299 | D8 = 0.097 | N5 = 1.77250 | V5 = 49.6 |
| R9 = 1.300 | D9 = 0.291 | N6 = 1.80518 | V6 = 25.4 |
| R10 = −7.256 | D10 = variable | | |
| R11 = −2.399 | D11 = 0.111 | N7 = 1.69680 | V7 = 55.5 |
| R12 = −162.835 | D12 = variable | | |
| R13 = 5.275 | D13 = 0.319 | N8 = 1.69680 | V8 = 55.5 |
| R14 = −2.249 | D14 = 0.458 | | |
| R15 = (aperture) | D15 = 0.305 | | |
| R16 = 3.817 | D16 = 0.319 | N9 = 1.58913 | V9 = 61.2 |
| R17 = −7.490 | D17 = 0.187 | | |
| R18 = −1.322 | D18 = 0.111 | N10 = 1.80518 | V10 = 25.4 |
| R19 = −2.190 | D19 = 0.020 | | |
| R20 = 1.575 | D20 = 0.402 | N11 = 1.51742 | V11 = 52.4 |
| R21 = −6.234 | D21 = 0.361 | | |
| R22 = 3.427 | D22 = 0.111 | N12 = 1.80518 | V12 = 25.4 |
| R23 = 1.070 | D23 = 0.101 | | |
| R24 = 2.632 | D24 = 0.347 | N13 = 1.56732 | V13 = 42.8 |
| R25 = −2.152 | D25 = 0.749 | | |
| R26 = ∞ | D26 = 0.638 | N14 = 1.51633 | V14 = 64.1 |
| R27 = ∞ | | | |

| Variable distance | Focal length | | |
| --- | --- | --- | --- |
| | 1.00 | 2.50 | 5.70 |
| D5 | 0.16 | 1.32 | 1.94 |
| D10 | 2.03 | 0.62 | 0.29 |
| D12 | 0.17 | 0.43 | 0.14 |

According to the present invention, a four-group zoom lens can be provided which has an aperture ratio of about 2.0 while maintaining a sufficient back-focal distance approximately twice as large as the focal length at the wideangle limit, and in which aberrations are suitably corrected.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The following claims is to be accorded a broadest interpretation so as to encompass all such modifications and equivalent structures and functions.

What is claimed is:

1. A zoom lens comprising:
   a first lens group having a positive refractive power;
   a second lens group having a negative refractive power and capable of being moved along the optical axis for zooming;
   a third lens group movable to correct the movement of an image surface caused by zooming; and
   a fourth lens group having a positive refractive power that is stationary during zooming, said first to fourth lens groups being successively arranged from the object side in this order;
   wherein said fourth lens group consists of a first lens at a positive refractive power for reducing, in a step-by-step fashion, divergence of a light beam caused by the third lens group, and also a second lens having a positive refractive power, a third lens having a negative refractive power, a fourth lens having a positive refractive power, a fifth lens having a negative refractive power, and a sixth lens having a positive refractive power;
   wherein if the overall focal length of the system at the wideangle end is $F_w$; the focal length of the second lens group is $F_2$; the focal length of the combination of said second lens to said sixth lens of said fourth lens group is $F_{42}$; and the focal length of the combination of said second lens to said fourth lens is $F_A$, then the conditions:

$$0.85 < |F_2/F_W| < 1.0$$
$$2.50 < F_{42}/F_W < 3.0$$
$$0.80 < F_A/F_{42} < 1.0$$

are satisfied.

2. A zoom lens according to claim 1, wherein if the sum of the free air spacings between said fourth lens to said sixth lens is $D_A$; the mean for the refractive indices of said fourth lens to said sixth lens is $N_P$; and the difference between the Abbe's numbers of said fifth lens and said sixth lens is $t_A$, then the conditions;

$$0.4 < D_A/F_W < 0.6$$
$$1.5 < N_P < 1.6$$
$$15 < t_A < 20$$

are satisfied.

* * * * *

UNITED STATES PATENT AND TRADEMARK OFFICE
CERTIFICATE OF CORRECTION

PATENT NO. : 5,146,366  Page 1 of 3

DATED : September 8, 1992

INVENTOR(S) : HITOSHI MUKAIYA

It is certified that error appears in the above-identified patent and that said Letters Patent is hereby corrected as shown below:

On the title page, Foreign Patent Documents:

Line "1790911 7/1989 Japan." should read --1-170911 7/1989 Japan.--.

Column 1:

Line 65, "positive" should read --a positive--.

Line 67, "$F_w;$" should read --$F_w;$

Column 2:

Line 10, "Satisfied." should read --satisfied.--

Line 41, "second lens having a second lens" should read --second lens--.

Line 50, "$F_w;$" should read --$F_w;$--.

Column 3:

Line 1, "abera-" should read --aberra--.

Line 26, "$D_A$ the" should read --$D_A$ is the--.

Line 27, "NP" should read --$N_P$--.

Line 28, "$V_A$" should read --$v_A$--.

Line 66, "$b_f/F_w,$" should read --$b_f/F_w,$--.

Column 4:

Line 4, "$V_i.$" should read --$v_i.$--.

UNITED STATES PATENT AND TRADEMARK OFFICE
CERTIFICATE OF CORRECTION

PATENT NO. :  5,146,366

DATED :  September 8, 1992

INVENTOR(S) :  HITOSHI MUKAIYA

It is certified that error appears in the above-identified patent and that said Letters Patent is hereby corrected as shown below:

Column 4:

Line 6, "R28" should read --R27--.

Line 23, "variable" should read --variables--.

Line 26, "value" should read --values--.

Column 5:

Example 3, "R20=1.596" should read --R20=1.576--.

Column 6:

Line 38, "is" should read --are-- and "a" should read --the--.

Line 63, "$F_w$;" should read --$F_w$;--.

Column 7:

Line 10, "to" should read --and--.

UNITED STATES PATENT AND TRADEMARK OFFICE
CERTIFICATE OF CORRECTION

PATENT NO. : 5,146,366 Page 3 of 3
DATED : September 8, 1992
INVENTOR(S) : HITOSHI MUKAIYA It is certified that error appears in the above-identified patent and that said Letters Patent is hereby corrected as shown below:

Column 8:

Line 2, "$t_A,$" should read --$v_A,$--.

Line 6, "$15<t_A<20$" should read --$15<v_A<20$--.

Signed and Sealed this

Nineteenth Day of October, 1993

Attest:

BRUCE LEHMAN

*Attesting Officer*   Commissioner of Patents and Trademarks